United States Patent [19]
Keller

[11] Patent Number: 5,157,986
[45] Date of Patent: Oct. 27, 1992

[54] LAMINATED COVER FOR INSULATING STEERING WHEELS

[76] Inventor: Theodore F. Keller, 2416 Yorktown #379, Houston, Tex. 77056

[21] Appl. No.: 810,333

[22] Filed: Dec. 19, 1991

Related U.S. Application Data

[63] Continuation-in-part of Ser. No. 658,907, Feb. 22, 1991, Pat. No. 5,074,165.

[51] Int. Cl.⁵ ............................ G05G 1/04; B32B 1/04
[52] U.S. Cl. ........................................ 74/558.5; 74/558; 428/76; 428/71; 428/65; 428/137; 428/193
[58] Field of Search ............... 428/76, 71, 65, 137, 428/193; 74/558.5, 558; 5/431, 443, 434, 436, 490

[56] References Cited

U.S. PATENT DOCUMENTS

| | | | |
|---|---|---|---|
| 1,202,734 | 10/1916 | Kirby | 74/558.5 |
| 1,251,313 | 12/1917 | White | 74/558.5 |
| 1,351,303 | 8/1920 | Scott | 74/558.5 |
| 3,256,133 | 6/1966 | Wright et al. | 428/76 X |
| 3,948,436 | 4/1976 | Bambara | 428/193 X |
| 4,102,377 | 7/1978 | Ostrem | 74/558.5 |
| 4,262,385 | 4/1981 | Norman | 74/558.5 |
| 4,450,193 | 5/1984 | Staebler | 428/193 X |
| 4,457,729 | 7/1984 | Peerlkamp | 428/71 X |
| 4,463,043 | 7/1984 | Reeves et al. | 428/71 X |
| 4,605,124 | 8/1986 | Sandel et al. | 74/558.5 X |
| 4,619,553 | 10/1986 | Fischer | 428/193 X |
| 4,685,499 | 8/1987 | Black | 74/558 X |
| 4,688,286 | 8/1987 | Miker | 5/434 X |
| 4,754,514 | 7/1988 | Limb et al. | 428/76 X |
| 4,756,937 | 7/1988 | Mentzer | 428/76 X |
| 4,807,303 | 2/1989 | Mann et al. | 428/71 X |
| 4,892,771 | 1/1990 | Rowland | 428/76 X |
| 4,911,975 | 3/1990 | Schult | 428/193 |
| 4,928,711 | 5/1990 | Williams | 5/434 X |
| 4,991,245 | 2/1991 | Franco | 5/490 |
| 4,993,281 | 2/1991 | Miller | 74/558.5 |
| 5,042,088 | 8/1991 | Sherrod et al. | 428/137 X |
| 5,042,318 | 8/1991 | Franz | 74/558.5 |
| 5,071,697 | 12/1991 | Gulya et al. | 428/137 X |
| 5,074,165 | 12/1991 | Keller | 74/558.5 |

FOREIGN PATENT DOCUMENTS

| | | | |
|---|---|---|---|
| 2622427 | 11/1977 | Fed. Rep. of Germany | 74/558 |
| 0202568 | 8/1989 | Japan | 74/558 |
| 691836 | 5/1953 | United Kingdom | 74/558 |

*Primary Examiner*—Vinh T. Luong
*Attorney, Agent, or Firm*—Michael P. Breston

[57] ABSTRACT

The novel cover is designed to insulate the steering wheel mounted on the hub portion of a steering wheel column of a vehicle. The rear panel has a center hole sized to substantially capture the hub portion of the steering wheel column. A slit extends downwardly from the center hole. The opposite edges of the slit spread apart to allow the steering wheel to easily slide into and out of the cover. The thermally-insulating cover is made of a flexible and easily deformable laminated material of a synthetic polymer weave fabric, containing an amide (nylon) group —CONH— as a recurring part of its chain, which is superimposed on and suitably bonded with resin to a thermally insulating foam.

3 Claims, 1 Drawing Sheet

LAMINATED COVER FOR INSULATING STEERING WHEELS

RELATED APPLICATION

This application is a continuation-in-part of co-pending application Ser. No. 07/658,907 filed on Feb. 22, 1991, now U.S. Pat. No. 5,074,165, which is not assigned and which is incorporated herein by reference.

BACKGROUND OF THE INVENTION

1. Field of the Invention

This invention relates generally to covers for insulating steering wheels and, more particularly, to nylon laminated covers for insulating steering wheels from hot or cold ambient air within parked vehicles.

2. Description of the Prior Art

In very hot dry summer or in very cold winter weather the air within cars or trucks parked outside can cause their steering wheels to reach temperatures which are very uncomfortable to the touch. Various types of steering wheel covers and materials for them have been proposed to remedy this problem and some of them are described in the following U.S. Pat. Nos.:

4,685,499
4,458,738
4,102,377
2,601,881
1,997,738
1,987,599
1,927,913 and others are described in the patents made of record in said applicant's U.S. Pat. No. 5,074,165.

The prior art steering wheel covers that are known to me are intended primarily to inhibit the passage of solar radiation therethrough to the steering wheels, but not to effectively insulate them from the hot or cold ambient air within the parked vehicles.

U.S. Pat. No. 4,685,499 shows a steering wheel cover 10 having a pair of parallel, spaced-apart sheet members 21,22 whose cut out corners 21E,21F and 22E,22F respectively define top vent apertures 36 and 38 which allow the ambient air in the parked vehicle to circulate therethrough (Col. 5, lines 8–13). Therefore, the temperature of the steering wheel also fluctuates with the ambient air temperature within the parked vehicle.

There has been a long-felt need for materials for steering wheel covers that can effectively insulate steering wheels from the hot or cold ambient air and that are resistant to oils, greases, solvents, fatigue and abrasion and at the same time exhibit high thermal stability, high tensile strength, adequate toughness, and retention of physical properties over a wide temperature range in order to withstand the abuse to which such covers are normally subjected inside and outside the cars.

For example, U.S. Pat. No. 4,102,377 shows a steering wheel cover 10 forming an arcuate pocket 12 that is lined with an insulating foam 20 (Col. 2, lines 51–65). Arcuate pocket 12 defines a cavity 18 which receives the upper half, while a frontal skirt 14 overlays the lower half of the steering wheel S, which is exposed continuously to the hot or cold ambient air within the parked vehicle. Therefore, the temperature of the steering wheel rises and falls with the ambient air temperature.

U.S. Pat. No. 4,102,377 makes the steering wheel cover out of a cover sheet 10 of Teflon normally used for ironing board covers. Such materials do not have a soft feeling to the touch. Sheet 10 is lined with a foam 20 having its upper portion bent over under the upper portion as shown at 28 (FIG.3) and is sewn to the periphery of the cover sheet by suitable peripheral stitching 30 (Col. 2, lns. 14–17). Such a lined construction results in ready separation of the foam lining from the cover sheet, and is relatively expensive to manufacture due to the excessive hand labor involved.

Most of the above and other well-known problems associated with the known prior steering wheel covers have been solved by the invention described in said applicant's co-pending application Ser. No. 07/658,907 which is incorporated herein by reference.

The present invention solves an encountered difficult manufacturing problem, and it differs from that described in said co-pending application primarily in that the present steering wheel cover is made of a cover preferably made of a laminated material composed of a synthetic polymer fabric that contains an amide group nylon), CONH—, as a recurring part of its chain, bonded by a suitable bonding agent to thermal insulating foam. In the preferred embodiment of the invention, the synthetic polymer is preferably in the form of a thin external sheet of polyamide (nylon) weave fabric laminated or bonded to a polyester open cell foam.

The synthetic thin sheet of nylon weave fabric has the following properties: resistance to oils, greases, solvents, fatigue and abrasion, low coefficient of friction, high thermal stability, high tensile strength, toughness, and retention of properties over a wide temperature range $-75°$ to $230°$ F.

As such, the laminated material is very importantly characterized by its amenability to relatively inexpensive mass-production techniques through the use of plastic fabrication technology or sewing.

SUMMARY OF THE INVENTION

The thermally-insulating cover is adapted for a steering wheel mounted on a steering wheel column of a motor vehicle, and it is made of a flexible and easily deformable laminated material defining a pocket to allow the steering wheel column to slide into the pocket. The laminated material is of a synthetic polymer weave fabric, containing an amide (nylon) group —CONH— as a recurring part of its chain, which is superimposed on and suitably bonded with resin to a thermally insulating foam.

In a preferred embodiment, the cover comprises a front panel having a bottom edge, and a rear panel having an opposite bottom edge defining therebetween an oval mouth of sufficient size to allow the steering wheel to slide into and out of the pocket. The rear panel has a center hole sized to substantially capture the steering wheel column. A slit extends downwardly from the center hole to the bottom edge of the rear panel. At least two slits extend radially from the edge of the center hole to allow the diameter of the center hole to enlarge so as to accommodate steering wheel columns of larger diameters than the diameter of the center hole.

DETAILED DESCRIPTION OF A PREFERRED EMBODIMENT

Figure 1:
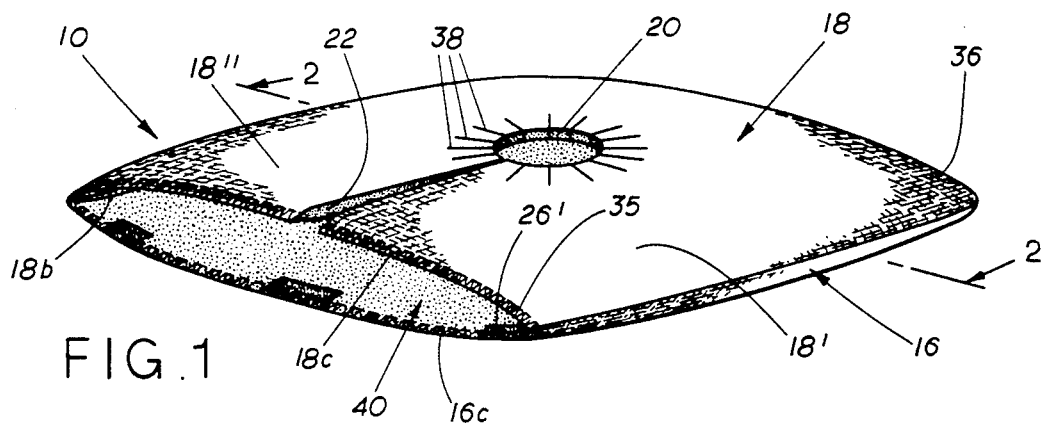
FIG. 1 is a rear perspective view of the novel steering wheel nylon laminated cover.

Throughout the drawings, the same reference characters designate the same or similar parts.

Figure 2:
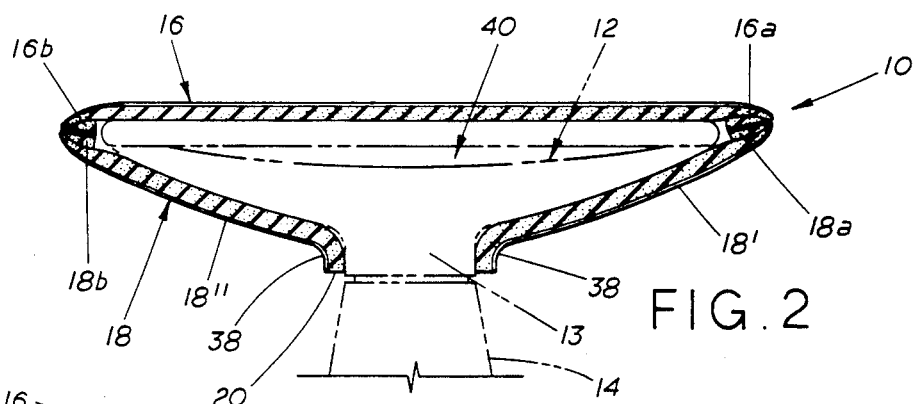
FIG. 2 is a lateral sectional view of the cover shown in FIG. 1 taken on lines 2—2 through the center thereof and shown mounted on a steering wheel and column.

FIGS. 1-2 show the novel nylon laminated cover, generally designated as 10, for thermally isolating the steering wheel 12 mounted on the hub 13 of a steering wheel column 14 of a parked motor vehicle.

Figure 3:
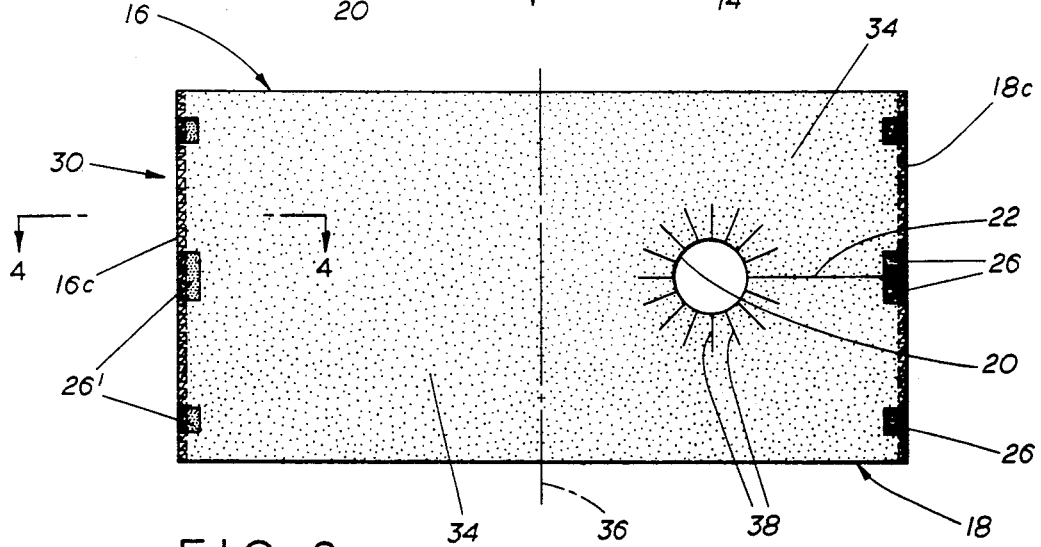
FIG. 3 is a planar view of the cover in an unfolded condition illustrating the process of making it.

When assembled, laminated cover 10 comprises a front panel 16 facing the driver and a rear panel 18 facing the dashboard. Front panel 16 has sides 16a, 16b and a bottom edge 16c (FIG. 3). Rear panel 18 has sides 18a, 18b and a bottom edge 18c. Rear panel 18 has a center hole 20, typically of circular shape, which is sized to accommodate and snugly capture hub 13 of steering wheel column 14. A very narrow straight slit 22 extends from hole 20 down to bottom edge 18c, thereby dividing the lower half of panel 18 into two equal quarter panels 18' and 18" (FIG. 1).

Fastener means (FIG. 3) are provided between the opposite bottom edges 16c and 18c. The preferred fasteners are mating VELCRO (TM of Velcro USA, Inc.) strips 26, 26'. Strip 26 carries woven hooks and strip 26' carries woven loops to allow for detachable mechanical interaction to take place therebetween.

Figure 4:
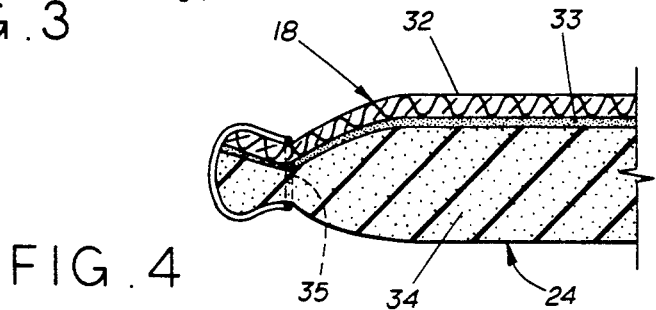
FIG. 4 is an enlarged partial sectional view taken on line 4—4 of FIG. 3.

Laminated cover 10 is preferably made of a laminated material 24 (FIG. 4) composed of a synthetic polymer fabric 32 that contains an amide group (nylon), CONH—, as a recurring part of its chain, bonded by a suitable bonding agent 33 to thermal insulating foam 34 which covers the entire interior surface of cover 10. In the preferred embodiment of the invention, the synthetic polymer is preferably in the form of a thin external sheet of polyamide (nylon) weave fabric 32 bonded under heat to a ¼ inch polyester open cell foam 34.

The nylon fabric 32 is a product of E. I. DuPont de Nemours & Co., Wilmington Del. The foam 34 is available from General Foam in Paramus, N.J. The nylon laminated material 24 is available in a wide range of colors from Innovative Laminating Corp., Passaic N.J.

Weave fabric 32 is characterized by its high resistance to oils, greases, solvents, fatigue and abrasion, its low coefficient of friction, high thermal stability, high tensile strength, toughness, and retention of properties over a temperature range $-75°$ to $230°$ F. and under tough environmental conditions. It offers a pleasing sensation to touch, and is very pliable.

As such, laminated material 24 is very importantly characterized by its amenability to relatively inexpensive mass-production techniques through the use of plastic fabrication technology.

The process for making laminated cover 10 involves cutting out a rectangle 30 (FIG. 3) from the laminated material 24. The rectangle has an inner surface whose center dividing line 36 partitions rectangle 30 into two equal halves 16 and 18 on the opposite sides of line 36. Line 36 becomes the top edge of cover 10 (FIG. 1) in the folded condition.

A circular disc is cutout from the center of panel 18 thereby leaving center hole 20. Straight long slit 22 is then cut starting from the edge of hole 20 down to bottom edge 18c.

To accommodate different sizes of hubs 13, it is also preferred to cut at least two but preferably a plurality of short radial slits 38 extending outwardly and radially from the center of hole 20. Radial slits 38 allow the diameter of hole 20 to gradually enlarge, thereby accommodating hubs 13 of steering wheel columns 14 whose diameters are larger than the diameter of hole 20. Thus, radial slits 38 allow for adjustability to accommodate a range of steering wheels. Pairs of opposite strips 26,26' (FIG. 3) are bonded to the bottom edges 16c, 18c, respectively, by a suitable adhesive or they can be sewn thereto.

Rectangle 30 is then folded over dividing line 36 and the opposite sides 16a, 16b and 18a, 18b (FIG. 2) are respectively united by sewing, whereby panels 16 and 18 form a pocket 40 (FIG. 1) therebetween having a closed top end 36 and an open bottom end or mouth which contains pairs of opposite, spaced apart mating fastener strips 26,26'. The opposite free edges 16c,18c receive peripheral reinforcing stitches 35.

In use, pocket 40 is of sufficient length and width to completely envelop steering wheel 12 and to allow it to easily slide into and out of the pocket by spreading apart the opposite edges of slit 22, while hub portion 13 of steering wheel column 14 becomes nested within center hole 20 (FIG. 2).

Thereafter, the opposite edges of slit 22 return to their normally abutting position, and pocket 40 is closed by pressing slightly on strips 26,26'.

The panels 16,18, center hole 20, and slit 22 are sized to substantially fully thermally insulate the exposed surfaces of hub portion 13 and of its steering wheel 12, and to minimize ambient hot or cold air from circulating around the steering wheel. The laminated cover 10 is donned on steering wheel 12 by sliding it into pocket 40 until hub portion 13 of steering wheel column 14 slides through narrow slit 22 into center hole 20 of rear panel 18 at which time the entire steering wheel is fully captured inside the pocket.

It will be appreciated that steering wheel laminated cover 10 is safe, trouble-free, and provides a completely new and unique approach to steering wheel cover design. It successfully accomplishes its objectives by virtue of its simplicity, flexibility, versatility, ease of assembly and economy of manufacture.

What I claim is:

1. A cover for a steering wheel of a steering wheel column of a motor vehicle, said cover comprising:
    a front panel having a bottom edge, a rear panel having an opposite bottom edge, said front and rear panels forming therebetween a pocket having a closed top end, and said bottom edges defining therebetween an oval mouth of sufficient size to allow said steering wheel to slide into and out of said pocket through said mouth;
    said rear panel further having
        a) a center hole sized to capture said steering wheel column,
        b) a slit defining slit edges extending downwardly from said center hole to said bottom edge of said rear panel, and
        c) at least two radial slits extending outwardly from the edge of said center hole for accommodating steering wheel columns of larger diameter than the diameter of said center hole; and
    said cover including a thermally insulating foam and a woven fabric superimposed on and bonded to said foam, and said fabric being woven from a synthetic polyamide yarn.

2. A cover for a steering wheel according to claim 1, and fastener means on said bottom edge of said front and rear panels to open and close said mouth.

3. A cover for a steering wheel according to claim 2, wherein
said fastener means include complementary hook and loop woven strips.

* * * * *